United States Patent
Kuo (10) Patent No.: US 7,931,172 B2
(45) Date of Patent: Apr. 26, 2011

(54) PUMP DISPENSER USED WITH LOTION BOTTLE

(76) Inventor: Roy Kuo, Taipei (TW)

( * ) Notice: Subject to any disclaimer, the term of this patent is extended or adjusted under 35 U.S.C. 154(b) by 1011 days.

(21) Appl. No.: 11/735,632

(22) Filed: Apr. 16, 2007

(65) Prior Publication Data

US 2008/0251537 A1    Oct. 16, 2008

(51) Int. Cl.
*B67D 7/58* (2010.01)

(52) U.S. Cl. ........... 222/153.13; 222/153.14; 222/321.9; 222/384

(58) Field of Classification Search ............. 222/153.01, 222/153.11–153.14, 321.1, 321.7–321.9, 222/340, 341, 383.1, 383.3, 384, 385
See application file for complete search history.

(56) References Cited

U.S. PATENT DOCUMENTS

| | | | | |
|---|---|---|---|---|
| 4,369,899 A | * | 1/1983 | Magers et al. ........... | 222/153.13 |
| 4,589,574 A | * | 5/1986 | Foster ....................... | 222/153.13 |
| 5,615,806 A | * | 4/1997 | Grothoff .................. | 222/153.13 |
| 6,695,171 B2 | * | 2/2004 | Walters et al. ........... | 222/153.13 |
| 7,757,897 B2 | * | 7/2010 | Young et al. ............. | 222/153.13 |
| 2007/0080174 A1 | * | 4/2007 | Coe et al. .................. | 222/153.13 |
| 2008/0190960 A1 | * | 8/2008 | Pfannhauser et al. ... | 222/153.13 |

* cited by examiner

*Primary Examiner* — J. Casimer Jacyna
(74) *Attorney, Agent, or Firm* — Chun-Ming Shih (57) ABSTRACT

A pump dispenser includes a tube seat engaged in a rotating lid of the lotion bottle; a pump arranged on a bottom of the tube seat for drawing the lotion unilaterally; a through hole arranged in the tube seat and communicated with the pump; a pipe movably received in the through hole to be configured for guiding the lotion in the pump; a press head placed over an opening of the pipe exposed out of the top of the through hole to be configured for guiding the lotion in the pipe out; at least one upper trapezoidal body opening upwards and at least one lower trapezoidal body opening downwards arranged on the inner surface of the through hole; and at least one protrusion arranged on the outer surface of the pipe. The protrusion moves into or out of the bottom of the lower trapezoidal body by rotating the head press for preventing or permitting the press head from moving upwards such that the lotion bottle is convenient to be carried. The protrusion moves into or out of the top of the upper trapezoidal body by rotating the head press for preventing or permitting the press head from moving downwards such that the lotion will not be drawn out when the press head is accidentally pressed.

7 Claims, 10 Drawing Sheets

FUG. 6

PUMP DISPENSER USED WITH LOTION BOTTLE

FIELD OF THE INVENTION

The present invention relates to pump dispensers, and more particularly to a pump dispenser used with a lotion bottle for supplying the lotion therein.

DESCRIPTION OF THE RELATED ART

Now, lotion bottles are widely used in washrooms, bathrooms, locker rooms of swimming pools and so on. The lotion bottles generally contain liquid hand soap, body wash, shampoo, etc, for serving users. Furthermore, the lotion bottles generally have a pump dispenser arranged thereon.

The conventional pump dispenser has a press head, which moves upwards or downwards to change an inner space of a pump. If the press head moves downwards, the inner space of the pump decreases such that the lotion in the pump is extruded into a pipe and then guided to the press head to be expelled. If the press head moves upwards, the inner space of the pump increases such that the lotion in the lotion bottle is guided into the pump.

However, when the press head of the lotion bottle is in the up position, the press head is easily susceptible to accidental pressing such that the lotion is wasted and stains the surroundings. Furthermore, since the press head is generally arranged on the lotion bottle, once in the up position, the lotion bottle is difficult to carry for travel. In addition, pollutants can easily enter into the lotion bottle along a portion of the pipe exposed out of the press head to contaminate the lotion inside the lotion bottle while in use or not in use.

What is needed, therefore, is a pump dispenser to solve the above problems.

BRIEF SUMMARY

To solve the above problems, the present invention provides a pump dispenser used with a lotion bottle. The pump dispenser has a press head, which is prevented from moving downwards or upwards, such that the lotion bottle is convenient to be carried for travel and the lotion will not be expelled when the press head is accidentally pressed. Pollutants can be shielded from the lotion bottle to prevent contamination and the convenience of the pump dispenser is much improved.

A pump dispenser used with a lotion bottle in accordance with a preferred embodiment, includes a tube seat inserted into a rotating lid of the lotion bottle; a pump arranged on a bottom of the tube seat for drawing the lotion unilaterally; a through hole arranged in the tube seat and communicated with the pump; a pipe inserted actively into the through hole to be configured for guiding the lotion in the pump; a press head placed over an opening of the pipe exposed out of the top of the through hole to be configured for guiding the lotion in the pipe out; at least one upper trapezoidal body opening upwards and at least one lower trapezoidal body opening downwards arranged on the inner surface of the through hole; a circular groove formed on the tube seat and surrounding the through hole; at least one protrusion arranged on the outer surface of the pipe; and an outer pipe arranged on the bottom of the press head and inserted actively into the open of the through hole for shielding the pipe. The circular groove has a height lower than the opening of the through hole. The outer pipe is also inserted actively into circular groove.

The protrusion can move into or out of the bottom of the lower trapezoidal body by rotating the press head for preventing or permitting the press head upwards. The protrusion also can move into or out of the top of the upper trapezoidal body by rotating the press head for preventing or permitting the press head moving downwards.

Other objects, advantages and novel features of the invention will become more apparent from the following detailed description when taken in conjunction with the accompanying drawings, in which:

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 6 is a schematic, perspective view of a pipe of FIG. 1

DETAILED DESCRIPTION

Reference will now be made to the drawings to describe a preferred embodiment of the present pump dispenser, in detail.

Figure 1:
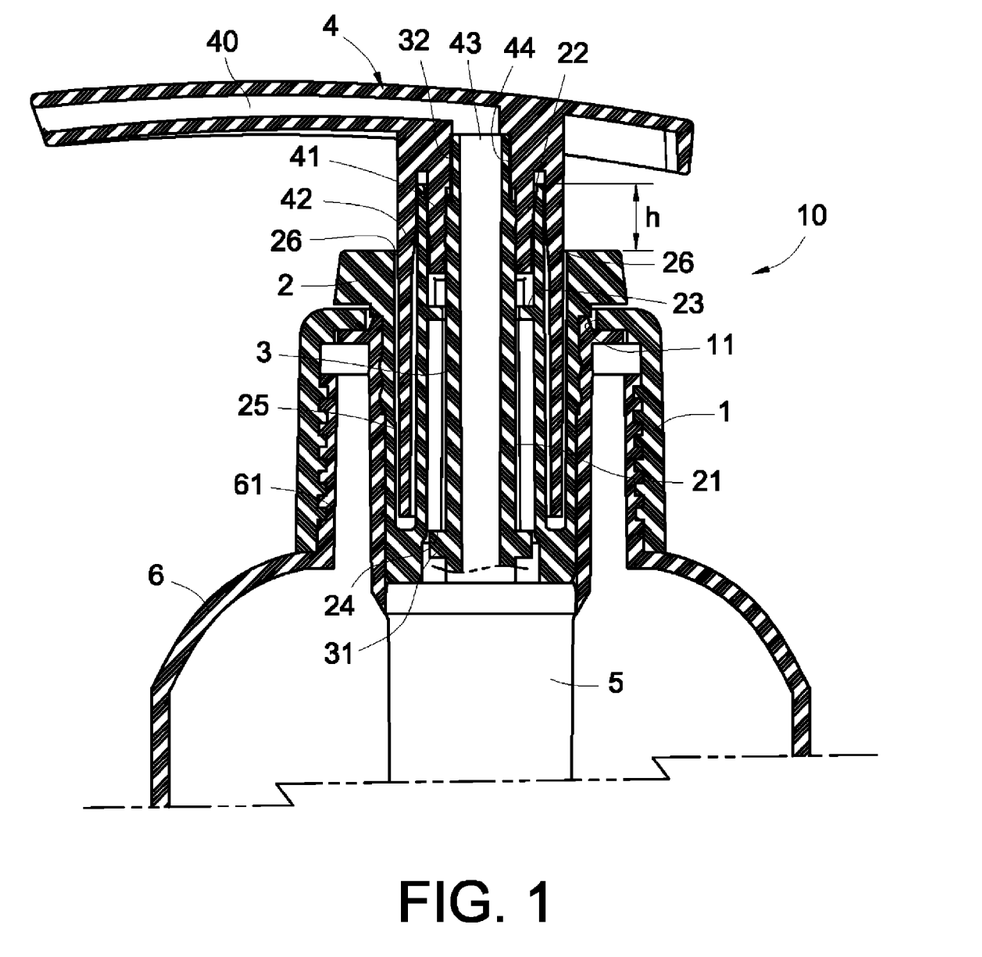
FIG. 1 is a schematic, cross-sectional view of a pump dispenser used with a lotion bottle in accordance with the present invention.
Figure 2:
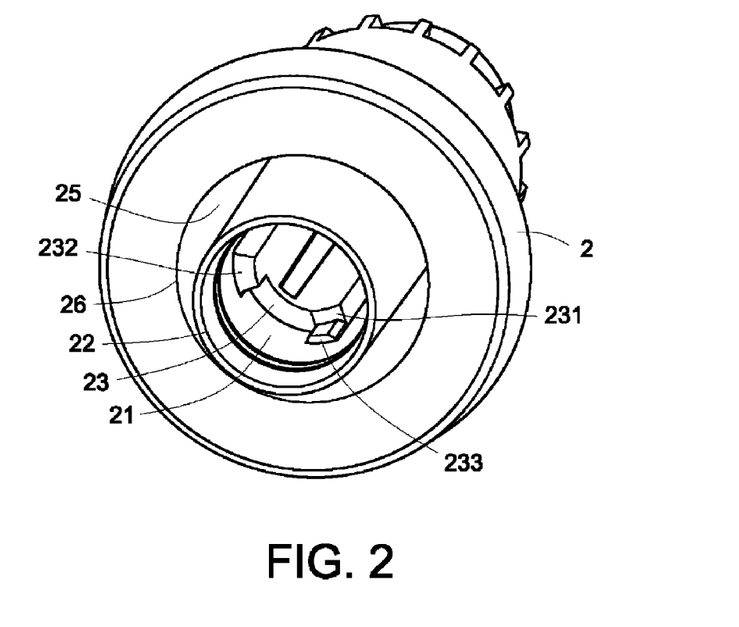
FIG. 2 is a schematic, perspective view of a tube seat of FIG. 1.

Referring to FIG. 1, a pump dispenser 10 used with a lotion bottle 6 in accordance with a preferred embodiment of the present invention is shown. The present pump dispenser 10 includes a tube seat 2, a pump 5, a pipe 3, and a press head 4. The tube seat 2 is engaged in a through hole 11 arranged on a rotating lid 1, and the rotating lid 1 is screwed onto an opening 61 of the lotion bottle 6. The pump 5 is linked with the bottom of the tube seat 2 to extrude the lotion unilaterally. A plug using a spring to be repositioned elastically, and a unilateral valve are arranged in the pump 5. The tube seat 2 has a through hole 21 arranged thereon to be communicated with the pump 5, and the pipe 3 is received actively into the through hole 21 for guiding the lotion in the pump 5. The top of the pipe 3 has an opening 22 exposed outside of the top of the through hole 21 to contain an inner pipe 41 arranged on the bottom of the press head 4. The press head 4 has a guiding hole 40 arranged thereon and communicated with an opening 43 of the top of the inner pipe 41 to expel the lotion in the pipe 3 out.

Figure 3:
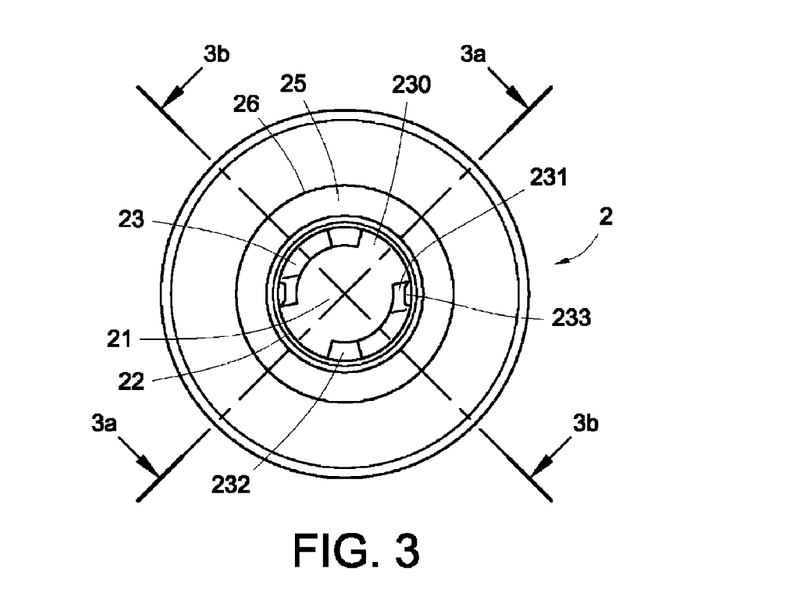
FIG. 3 is a schematic, top view of the tube seat of FIG. 1.
Figure 3A:
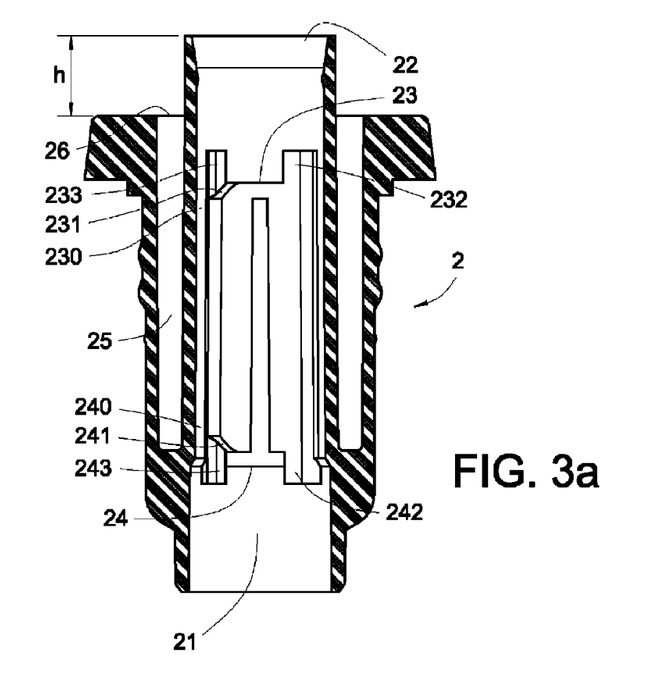
FIG. 3a is a schematic, cross-sectional view of the tube seat of FIG. 1.
Figure 3B:
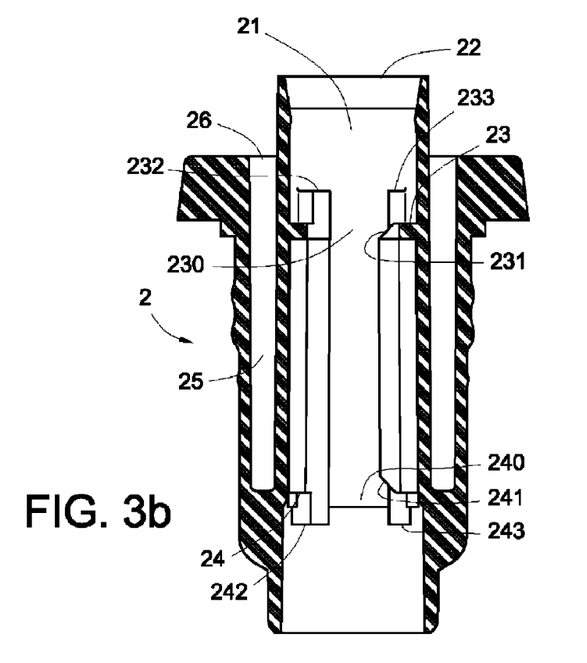
FIG. 3b is another schematic, cross-sectional view of the tube seat of FIG. 1.
Figure 4:
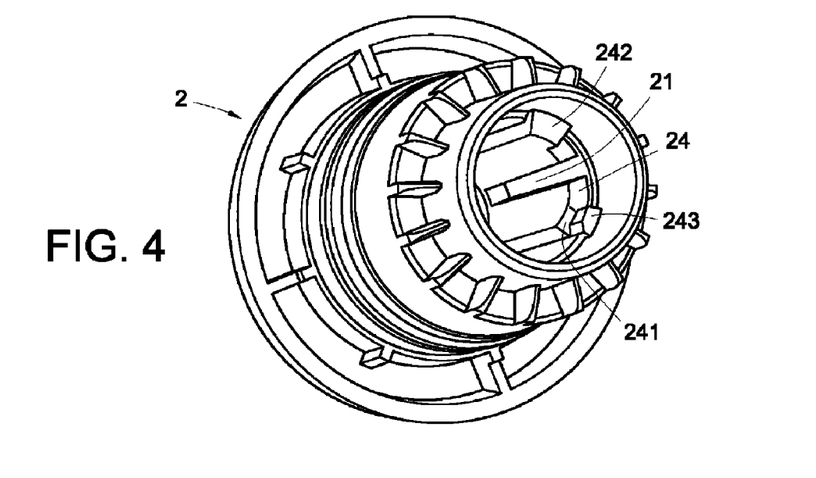
FIG. 4 is another schematic, perspective view of the tube seat of FIG. 1.
Figure 5:
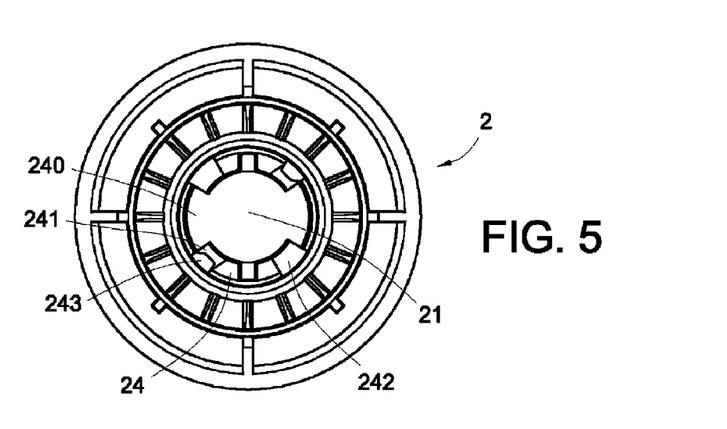
FIG. 5 is a schematic, bottom view of the tube seat of FIG. 1.
Figure 18:
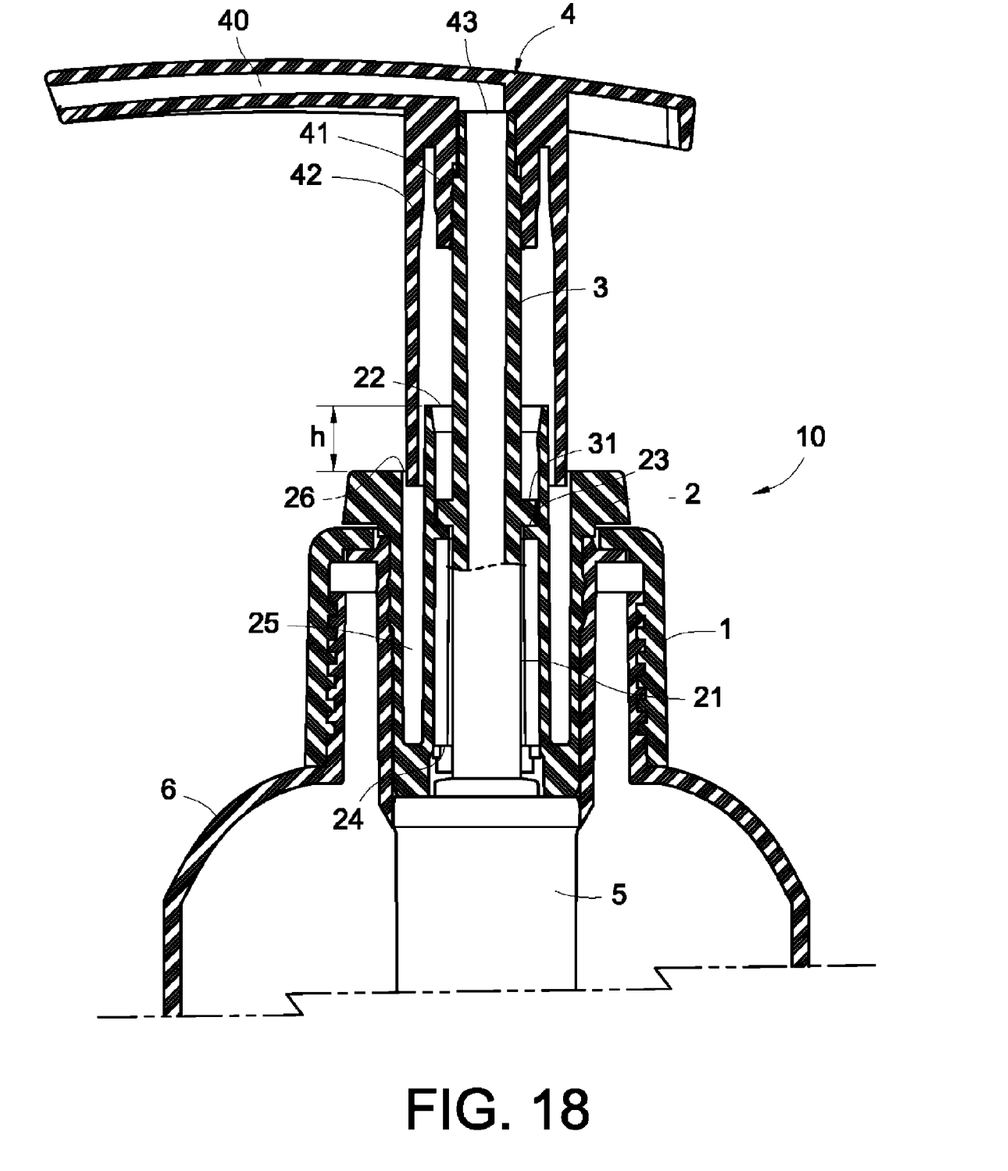
FIG. 18 is other schematic, cross-sectional view of the pump dispenser used with the lotion bottle in accordance with the present invention.

Referring to FIGS. 2, 3, 3a, and 3b together, two upper trapezoidal bodies 23 having the same height are arranged on the inner surface of the through hole 21, and two upper gaps 230 are formed respectively between the two upper trapezoidal bodies 23. Referring to FIGS. 4 and 5 together, two lower trapezoidal bodies 24 having the same height are arranged on the inner surface of the through hole 21, and two lower gaps 240 are formed respectively between the two lower trapezoidal bodies 24. The two lower gaps 240 are communicated respectively with the two upper gaps 230. A circular groove 25 is formed on the tube seat 2 and adjacent to the through hole 21. The circular groove 25 has a groove opening 26, which defines a height distance "h" to the opening 22 of the through hole 21 as shown in FIGS. 1, 3a and 18. That is, the groove opening 26 of the circular groove 25 is lower than the opening 22 of the through hole 21.

Figure 7:
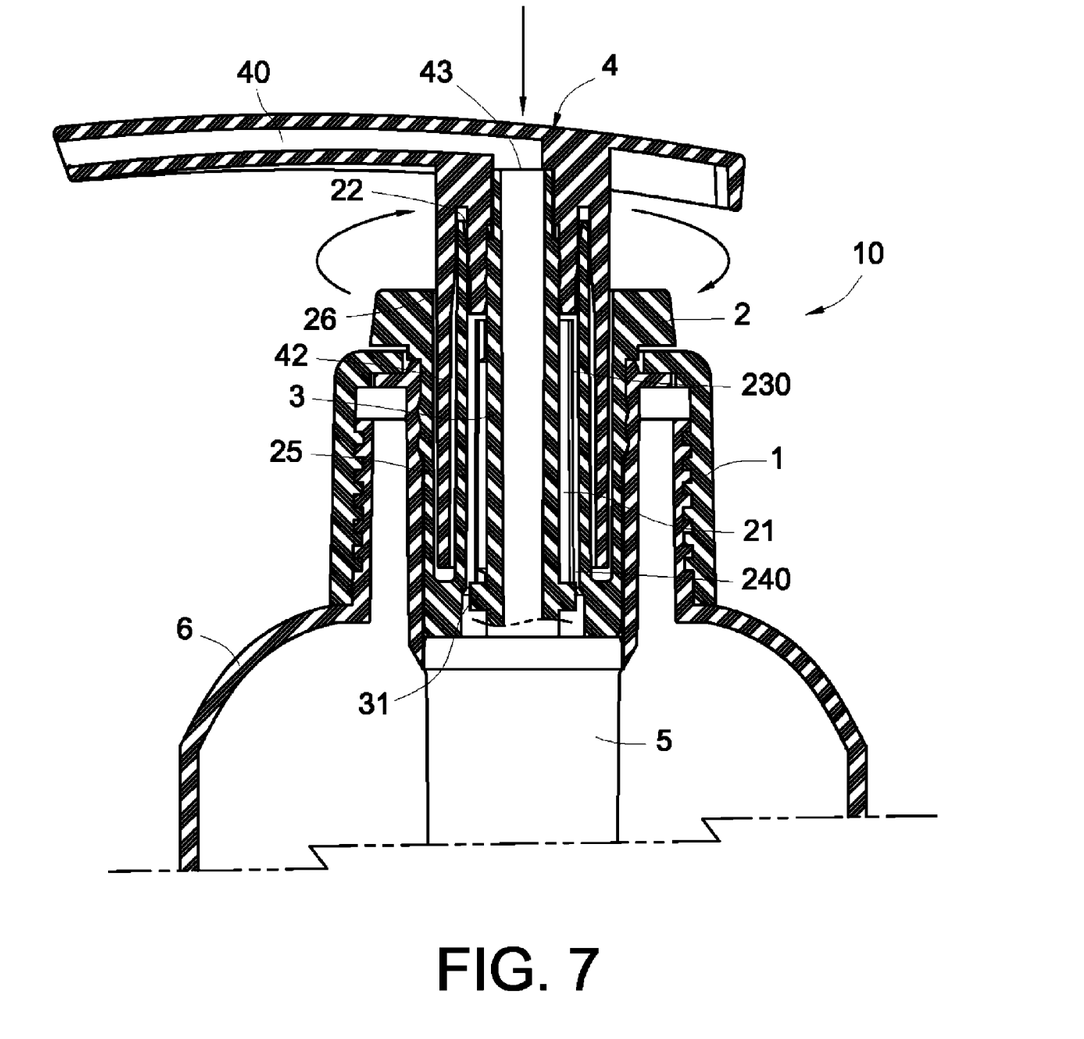
FIG. 7 is another schematic, cross-sectional view of the pump dispenser used with the lotion bottle in accordance with the present invention.
Figure 8:
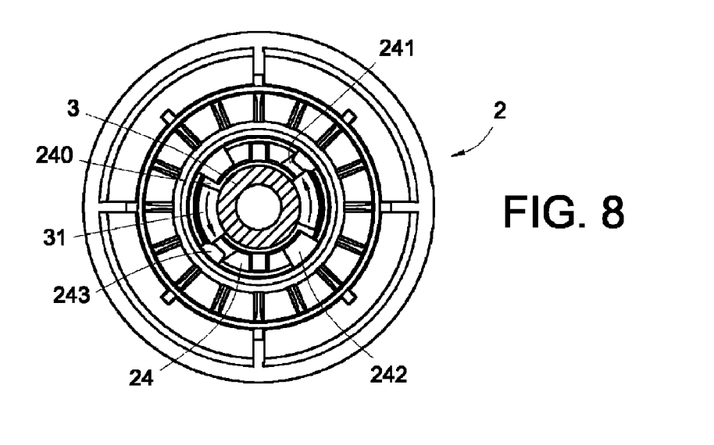
FIG. 8 is a schematic, cross-sectional view of FIG. 7.
Figure 14:
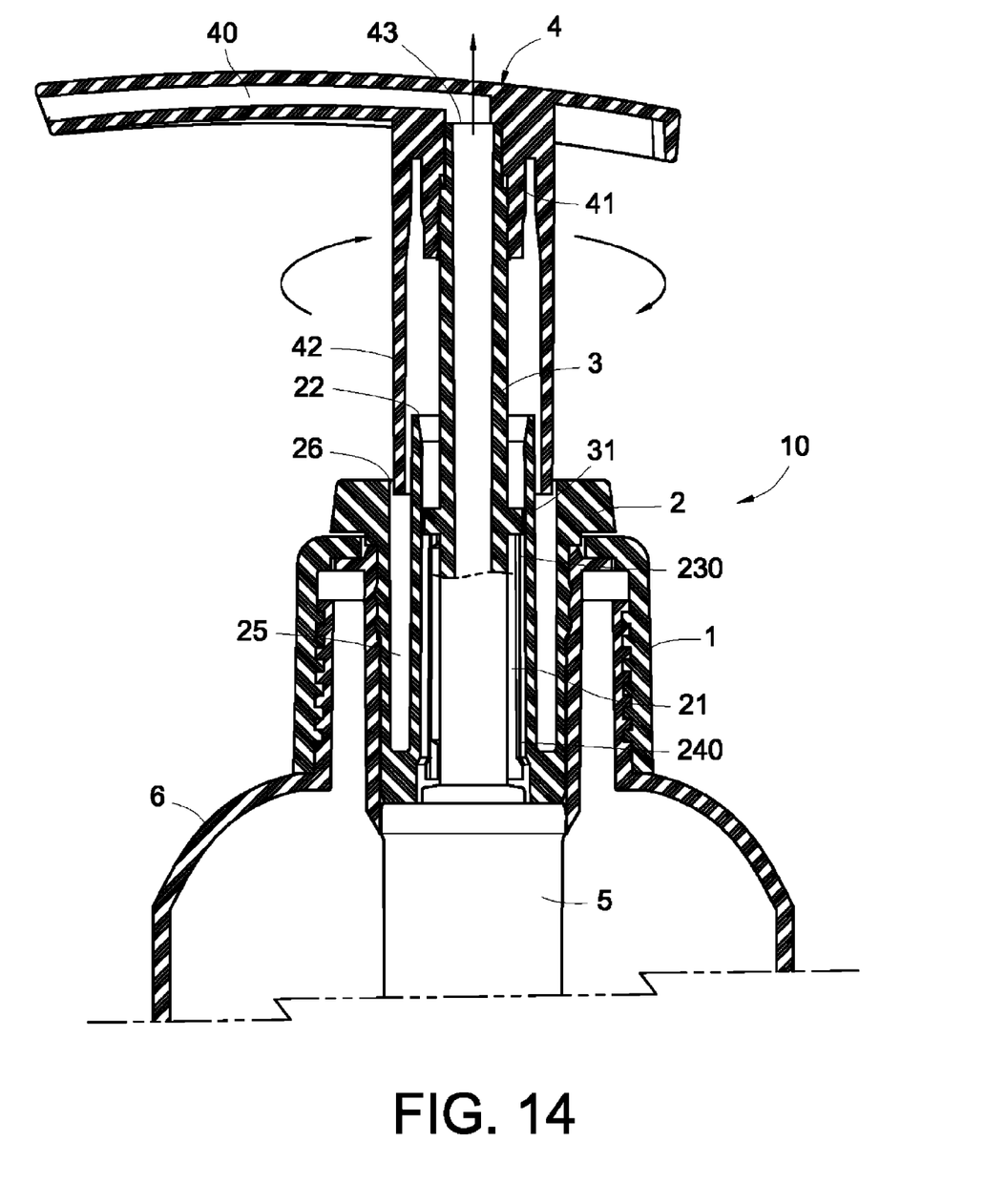
FIG. 14 is other schematic, cross-sectional view of the pump dispenser used with the lotion bottle in accordance with the present invention.

Referring to FIG. 6 together, two arc-shaped protrusions 31 are arranged on the outer surface of the pipe 3, and a first multi-angled surface 32 are formed on the outer surface of the top of the pipe 3. A second multi-angled surface 44 cooperated with the first multi-angled surface 32 is formed on the inner surface of the inner pipe 41 as shown in FIG. 1 to make the pipe 3 move with the press head 4 as shown in FIGS. 7 and 14. An outer pipe 42 coaxial with the inner pipe 41 is arranged on the bottom of the press head 4, movably received in the opening 22 of the through hole 21, and shields the part out of the top of the pipe 3 exposed out of the opening 22 of the through hole 21. The outer pipe 42 may also be movably received into the circular groove 25.

Each upper trapezoidal body 23 has a first incline 231 for permitting the protrusion 31 easy slipping thereinto as shown in FIGS. 2, 3, 3a and 3b, a first block 232 for preventing the protrusion 31 from moving, and a first wedge 233 for intervening the protrusion 31 from moving. Similarly, each lower trapezoidal body 24 has a second incline 241 for permitting the protrusion 31 easy slipping thereinto as shown in FIGS. 4 and 5, a second block 242 for preventing the protrusion 31 from moving, and a second wedge 243 for intervening the protrusion 31 from moving.

Figure 9:
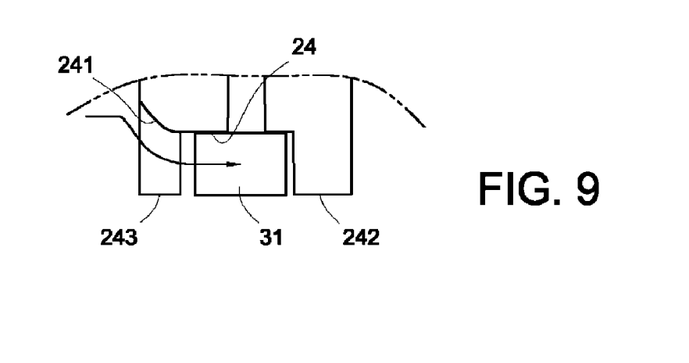
FIG. 9 is a schematic, cross-sectional view between the protrusion and the lower trapezoidal body of FIG. 7.
Figure 10:
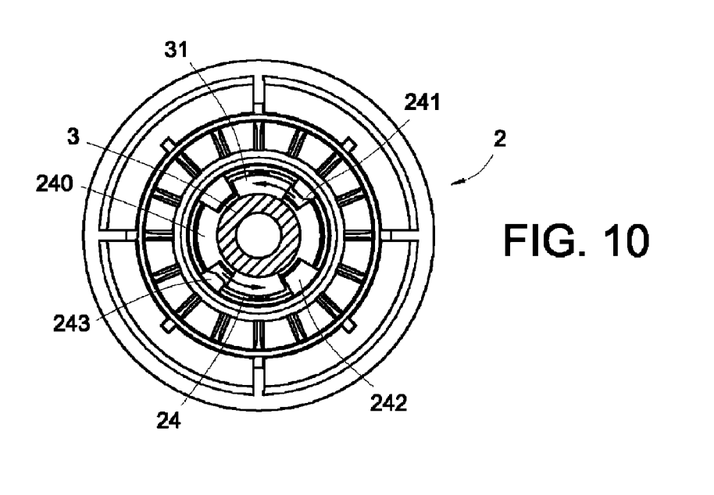
FIG. 10 is another schematic, cross-sectional view of FIG. 7.

The present invention can be operated through the above elements. When the users want to carry at least one lotion bottle 6 or carry a plenty of lotion bottles 6, the press head 4 of the lotion bottle 6 is pressed to move downwards as shown in FIG. 7, and the pipe 3 rotates with the rotation of the press head 4. Then the protrusion 31 moving with the pipe 3 slips into the bottom of the lower trapezoidal body 24 along the second incline 241 as shown in FIGS. 1, 9 and 10. At this step, the protrusion 31 will be intervened by the second wedge 243, so that the press head 4 must be rotated by a strong strength to overcome the intervening of the second wedge 243 and move into the bottom of the lower trapezoidal body 24. Finally, the protrusion 31 stops by the second block 242 and is positioned between the second block 242 and the second wedge 243 so that the protrusion 31 is limited at the bottom of the lower trapezoidal body 24 to prevent the pipe 3 and the press head 4 from moving upwards. Therefore, the lotion bottles 6 can be easily carried for travel.

Figures 11, 12, 13:
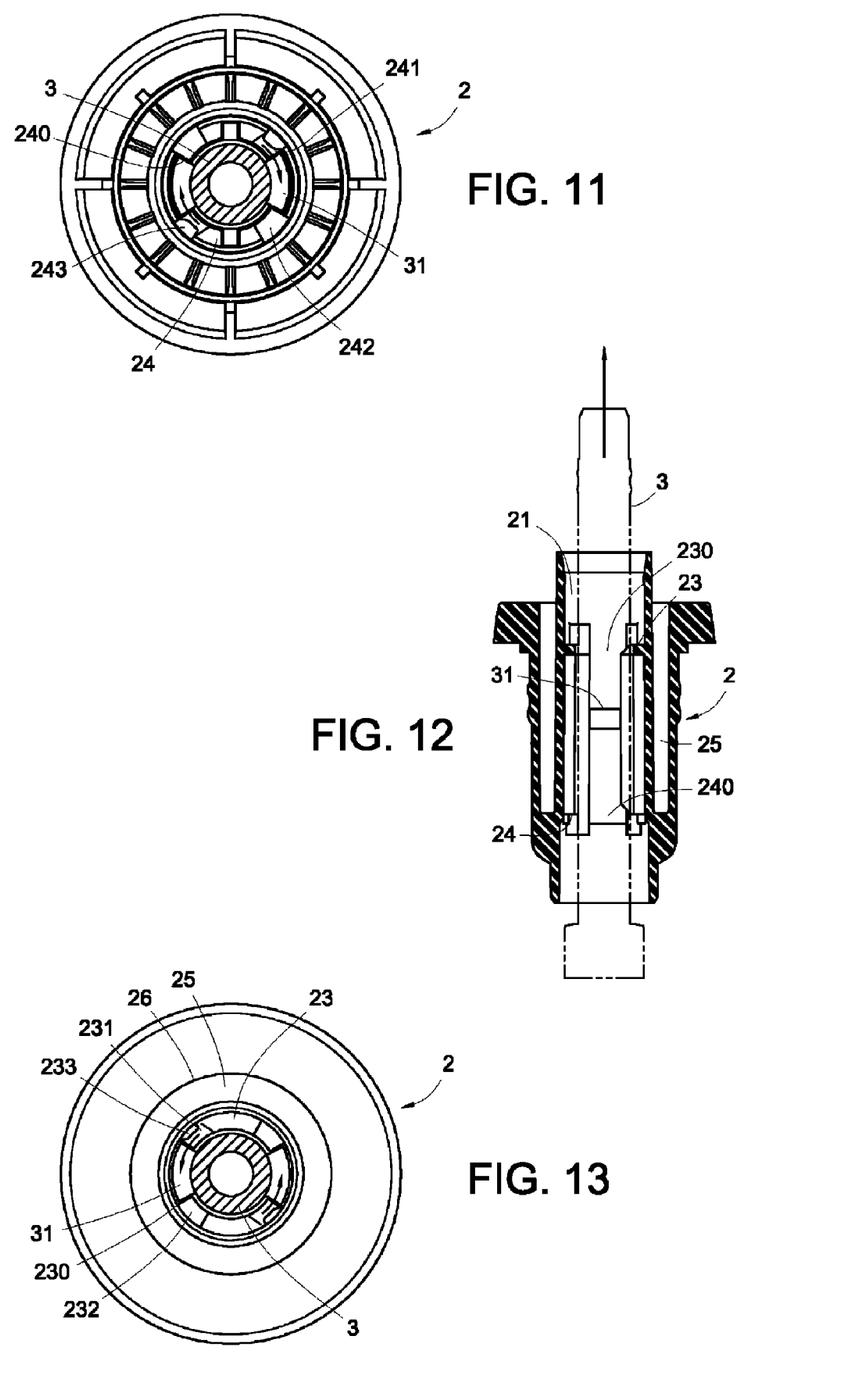
FIG. 11 is other schematic, cross-sectional view of FIG. 7.
FIG. 12 is a schematic, cross-sectional view between the protrusion and the tube seat of FIG. 7.
FIG. 13 is other schematic, dynamic cross-sectional view of FIG. 7.

When the users want to use the lotion of the lotion bottle 6, the press head 4 is rotated in a reverse direction to make the protrusion 31 rotate in the reverse direction as shown in FIG. 11. At this step, the press head 4 must be also rotated by a strong strength to make the protrusion 31 overcome the intervening of the second wedge 234 and move out of the bottom of the lower trapezoidal body 24 for entering the lower gaps 240 between the lower trapezoidal body 24 as shown in FIG. 7 to release the protrusions 31. The spring of the pump 5 drives the plug reposition to increase the space of the pump 5 for opening the unilateral valve such that the lotion of the lotion bottle 6 is drawn into the pump. The spring can also make the pipe 3 and the press head moving upwards as shown in FIG. 12. The protrusion 31 passes through the lower gaps 240 and move to the upper gaps 230 respectively. The users can press the press head 4 to make the pipe 3 moving downwards and drive the plug of the pump 5 moving downwards to decrease the space of the pump 5 for drawing the lotion in the pump to the pipe 3 and be expelled through the opening 43 and guiding hole 40 of the press head 4.

Figure 15:
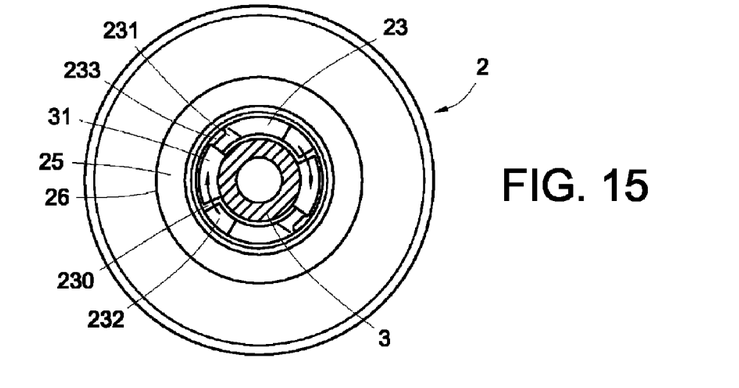
FIG. 15 is a schematic, cross-sectional view of FIG. 14.
Figure 16:
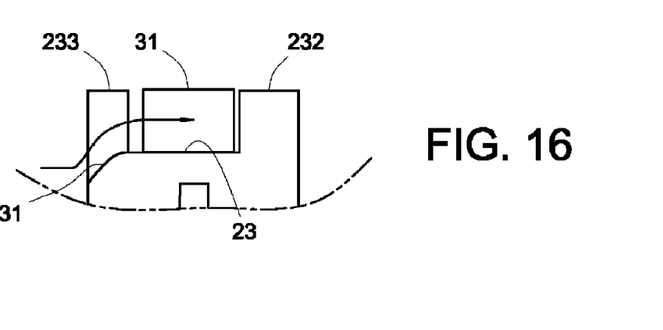
FIG. 16 is schematic, cross-sectional view between the protrusion and the upper trapezoidal body of FIG. 14.
Figure 17:
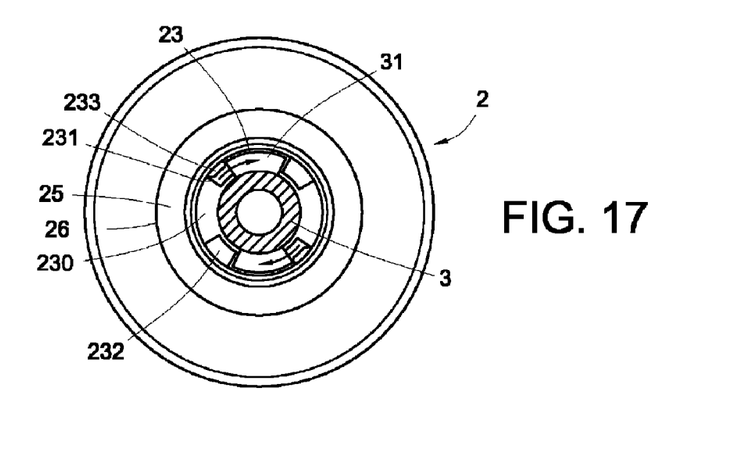
FIG. 17 is another schematic, cross-sectional view of FIG. 14.

When the users do not need the lotion of the lotion bottle 6 temporarily, the press head 4 can be rotated to make the pipe 3 rotating as shown in FIG. 15. The pipe 3 will bring the protrusion 31 slipping into the top of the upper trapezoidal body 23 as shown in FIGS. 15, 16, 17 and 18. At this step, the protrusion 31 will be intervened by the first wedge 233, and the press head 4 must be rotated by a strong strength to overcome the intervening of the first wedge 233 and move the protrusion 31 into the top of the lower trapezoidal body 23. The protrusion 31 will stop by the first block 232 to position between the first block 232 and the first wedge 233 such that the protrusion 31 is limited on the top of the upper trapezoidal body 23 to prevent the pipe 3 and the press head 4 from moving downwards. Therefore, the lotion of the lotion bottle 6 cannot be expelled in this condition to prevent the lotion from wasting and staining the surroundings.

When the users use the lotion of the lotion bottle 6 again, the press head 4 is rotated in a reverse direction to drive the protrusion 31 rotating in the reverse direction as shown in FIG. 13 such that the protrusion 31 move out of the top of the upper trapezoidal body 23 by overcoming the intervening of the wedge 233 and enter the upper gaps 230 of the upper trapezoidal body 23 as shown in FIG. 14 to be released. The users can obtain the lotion of the lotion bottle 6 by pressing the press head 4 again.

When the press head 4 of the lotion bottle 6 moves upwards and downwards as shown in FIGS. 1, 7, 14 and 18, the outer pipe 42 shields the opening 22 of the through hole 21 and the part of the top of the pipe 3 is exposed out of the opening 22 of the through hole 21 continuously, such that the pollutants cannot contaminate the lotion of the lotion bottle 6 through the opening 22 of the through hole 21. Furthermore, since the opening 22 of the through hole 21 is higher than the groove opening 26 of the circular groove 25, the pollutants on the circular groove 25 of the tube base 2 will expel on the desktop or the floor and cannot contaminate the lotion of the lotion bottle 6. Therefore, the lotion of the lotion bottle 6 can be finely preserved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pump dispenser used with a lotion bottle, comprising:
   a tube seat engaged in a rotating lid of the lotion bottle;
   a pump arranged on a bottom of the tube seat for drawing lotion unilaterally;
   a through hole arranged in the tube seat and communicated with the pump;
   a circular groove formed on the tube seat and surrounding the through hole, the circular groove having a height lower than the opening of the through hole;
   a pipe movably received in the through hole to be configured for guiding the lotion in the pump;
   a press head placed over an opening of the pipe exposed out of the top of the through hole to be configured for guiding the lotion in the pipe out;
   at least one upper trapezoidal body arranged on the inner surface of the through hole, comprising:
      a first incline; and
      a first wedge protruding above the first incline and towards the central axis of the through hole;
   at least one lower trapezoidal body arranged on the inner surface of the through hole, comprising:
      a second incline; and
      a second wedge protruding beneath the second incline and towards the central axis of the through hole; and
   at least one protrusion arranged on the outer surface of the pipe, the protrusion moving into or out of the bottom of the lower trapezoidal body by rotating the head press for preventing or permitting the press head from moving upwards, and the protrusion moving into or out of the top of the upper trapezoidal body by rotating the head press for preventing or permitting the press head from moving downwards.

2. The pump dispenser used as claimed in claim 1, wherein the first incline is for the protrusion easily slipping thereon.

3. The pump dispenser used as claimed in claim 1, wherein the second incline is for the protrusion easily slipping thereon.

4. The pump dispenser used as claimed in claim 1, wherein the upper trapezoidal body further has a first block for preventing the protrusion from moving.

5. The pump dispenser used as claimed in claim 4, wherein the first wedge is for intervening the protrusion from moving and placing the protrusion between the first block and the first wedge.

6. The pump dispenser used as claimed in claim 1, wherein the lower trapezoidal body further has a second block for preventing the protrusion from moving.

7. The pump dispenser used as claimed in claim 6, wherein the second wedge is for intervening the protrusion from moving and placing the protrusion between the second block and the second wedge.

* * * * *